United States Patent [19]
Setlabudi et al.

[11] Patent Number: 5,609,487
[45] Date of Patent: Mar. 11, 1997

[54] AUDIO VISUAL KARAOKE SYSTEM USING AUDIO CASSETTE

[75] Inventors: Dwidjaja Setlabudi; Djunedhi Listyono; Ketut Wihardika, all of Kudus; Markus S. B. Sutikno, Semarang; Ariffin Setawidjaja, Yogyakarta; Budianto, Kudus; Fransiscus X. S. Wijaya, Semarang, all of Indonesia

[73] Assignee: P. T. Hartono Istana Electronics, Indonesia

[21] Appl. No.: 385,716

[22] Filed: Feb. 8, 1995

[51] Int. Cl.[6] .............................. G09B 5/00; G10H 1/36
[52] U.S. Cl. ................... 434/307 A; 434/309; 434/316; 84/477 R; 369/62
[58] Field of Search .................... 434/307 R–309, 434/316, 319, 365; 84/454, 477 R, 601, 609, 615, 625, 645; 369/34, 48, 50, 59, 62, 63, 69; 360/33.1, 77.01; 358/310, 335, 341–343; 348/478, 484, 571, 595, 738

[56] References Cited

U.S. PATENT DOCUMENTS

| | | |
|---|---|---|
| 4,321,633 | 3/1982 | Saito .................................. 434/319 X |
| 4,586,905 | 5/1986 | Groff . |
| 4,615,024 | 9/1986 | Usui ......................................... 369/59 |
| 4,690,645 | 9/1987 | Ukisu ...................................... 434/309 |
| 4,968,254 | 11/1990 | Gangwere, Jr. et al. ............... 434/309 |
| 5,287,789 | 2/1994 | Zimmerman .......................... 84/477 R |
| 5,341,253 | 8/1994 | Liao et al. . |

FOREIGN PATENT DOCUMENTS

WO94/16503  7/1994  WIPO ................................ 434/307 A

OTHER PUBLICATIONS

Introductory Electronics for Scientists and Engineers, Simpson, Robert E., Second Editon (1987), Ch. 15.1, Analog/Digital Conversion, pp. 700–701.

Primary Examiner—Joe Cheng

[57] ABSTRACT

An audio visual karaoke system using a karaoke audio cassette to which high frequency signals have been added containing specific data information. In the audio player, these high frequency signals are separated from the audio signals by a high pass filter ("HPF"). Using a data converter, the high frequency signals are converted into data information. Subsequently, this data information is processed by a microprocessor and a display controller to generate lyrics or other information, which are displayed on a display device.

5 Claims, 7 Drawing Sheets

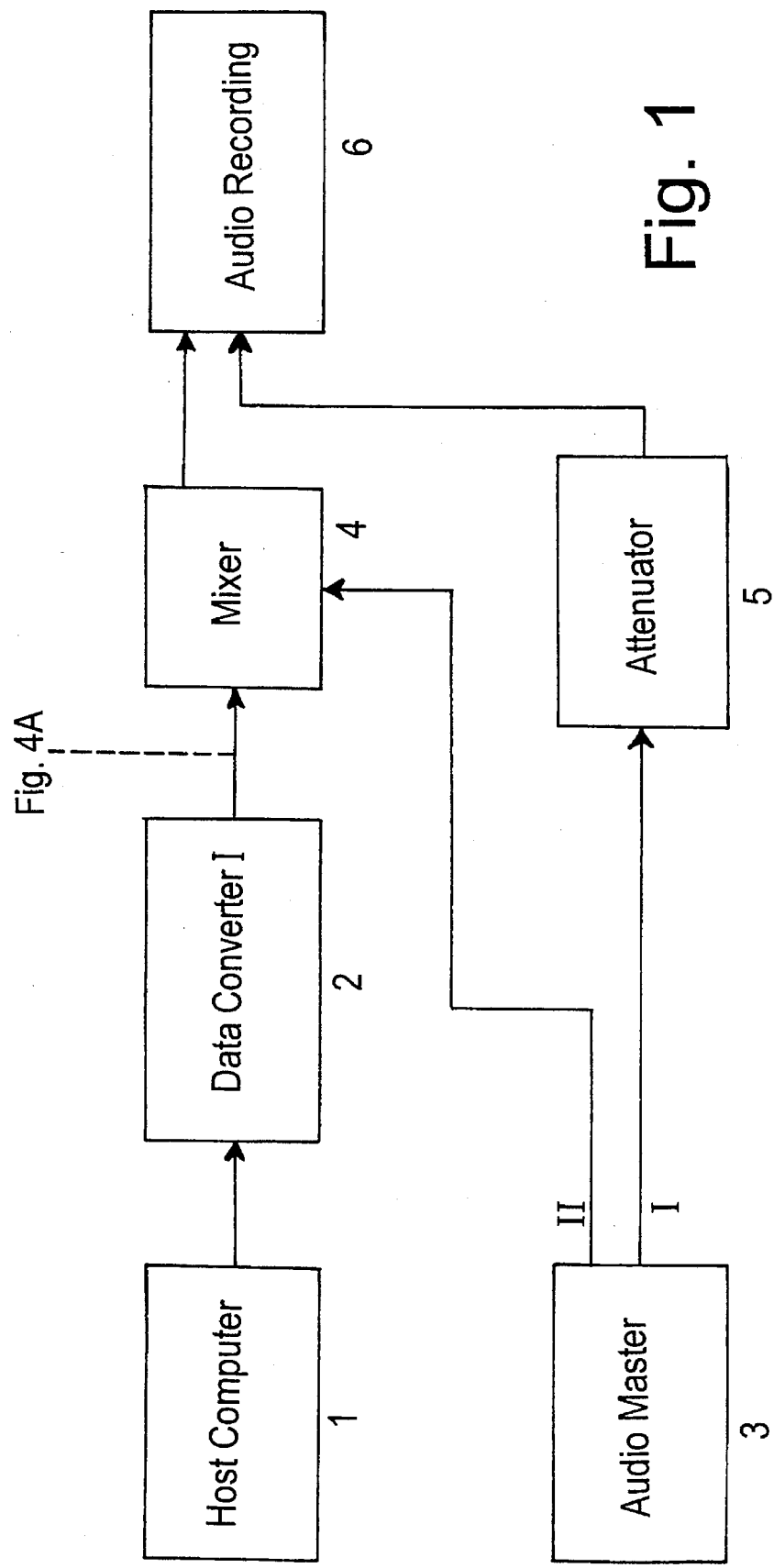

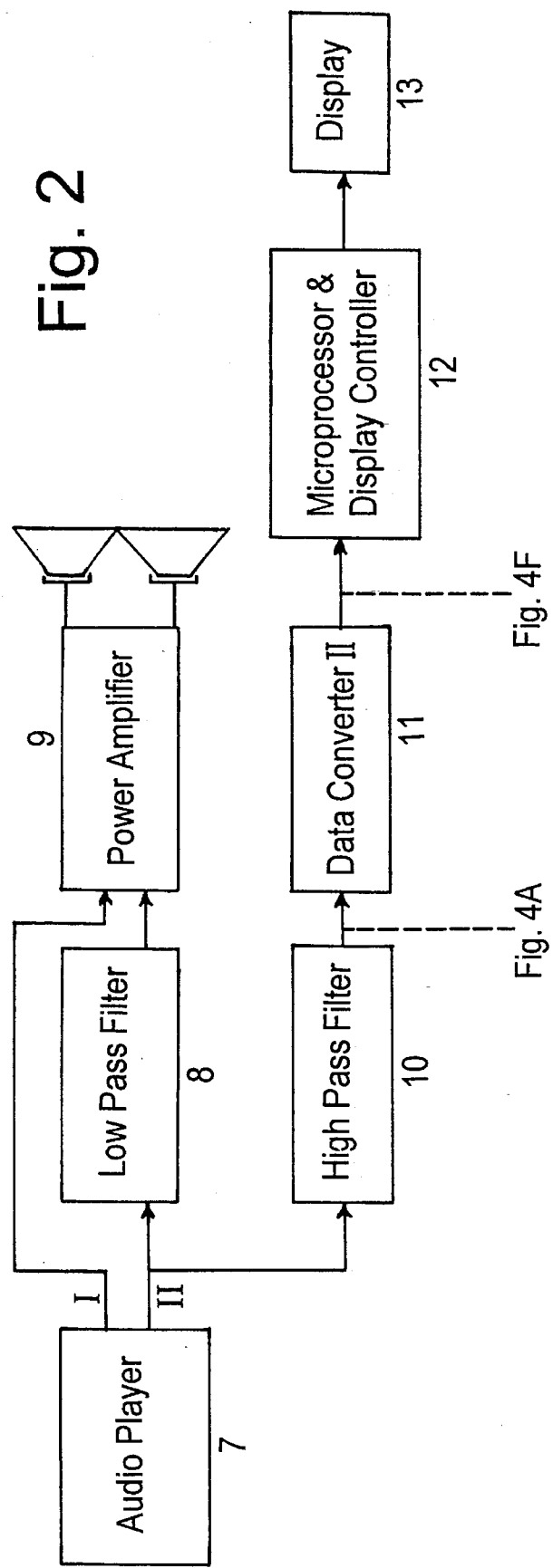

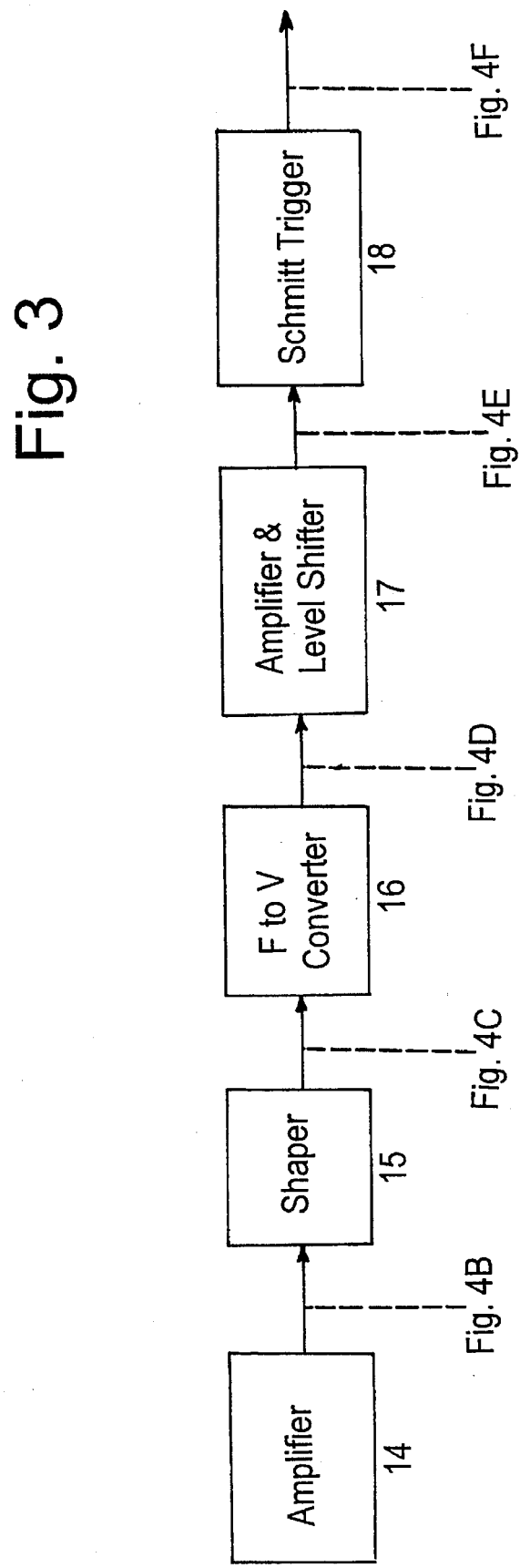

AUDIO VISUAL KARAOKE SYSTEM USING AUDIO CASSETTE

FIELD OF THE INVENTION

The present invention relates to a karaoke audio cassette player, combined with display features on a display device.

BACKGROUND OF THE INVENTION

Karaoke has become a popular form of entertainment. There are various karaoke systems with audio-visual capabilities, such as: laser discs, video cassette recorders and CD graphics. There are also certain types of karaoke players without visual display capabilities, such as: audio cassette multiplex players. Based on the fact that karaoke systems with visual display are relatively expensive, there is a need for a karaoke system which is relatively inexpensive. This can be achieved by adding a visual display capability to a audio cassette multiplex system at a relatively low price. This system will enliven the performance and make it easier for a singer to follow the music being played.

SUMMARY OF THE INVENTION

The object of the present invention is to improve the performance of karaoke audio cassette multiplex systems which currently require the singer to read the lyrics from printed or written pages. The present invention enables the singer to see the lyrics on the display device. An additional advantage of the present invention is the feature of displaying the lyrics synchronized with the song. This makes it easier for the singer to follow the music, such as with karaoke laser discs, video cassette recorder and CD graphics.

A further object of the present invention is the addition of high frequency data signals to the audio signal on the karaoke audio cassette during the recording process. A karaoke audio cassette which has undergone the above process is called a "SINGASONG" cassette. The "SINGASONG" cassette is compatible with any ordinary multiplex karaoke audio cassette as well as any conventional audio cassette.

A still further object of the present invention is the addition of a special module and a display device to the karaoke playback system which enables the system to display lyrics and other data.

In accordance with one aspect of this invention, there is provided a karaoke system comprising a combination of an audio cassette player and a karaoke video display device, together with a karaoke audio cassette, the karaoke audio cassette having a signal recorded thereon comprised of a mixed audio signal and a data information signal, the player including audio reproduction means for reproducing an audio signal from the karaoke audio cassette, the player further including a low pass filter for separating the data information signal from the mixed audio signal, amplifying means for amplifying the audio signal suitable for reproduction of the same through a speaker system; and a high pass filter adapted to separate a high frequency component from the audio signal, data converter means for converting the output of the high frequency pass filter into an original data information signal, and microprocessor means associated with a display controller for processing the data information signal and for controlling the display device.

In preferred embodiments, the system includes the above system with at least one serial data format. In a still further embodiment, the invention also includes the above system, where the system employs a frequency in the range of from 100 Hz to 250 KHz. Still further, another aspect of this invention relates to a karaoke player system comprising: a karaoke audio player; a low pass filter means adapted to separate data information from an audio signal; power amplifying means for amplifying said audio signal for transmission to at least one speaker; a high pass filter means adapted to separate a high frequency signal from said audio signal; a data converter means adapted to convert an output of the high pass filter means into an original data information signal; and a microprocessor and display controller means for processing said original data information signal and for controlling a display device. Yet another embodiment of the invention includes the above system, where the cassette player means comprises means for receiving at least two track audio cassettes. Still further, another aspect of the invention includes the above system, where the karaoke video display device comprises a colour or a black and white CRT display, a liquid crystal display, a light emitting diode display, a vacuum flourescent display, an electro luminescent display or a plasma display panel.

Having thus generally described the invention, reference will now be made to the accompanying drawings, illustrating preferred embodiments.

BRIEF DESCRIPTION OF THE DRAWINGS

FIG. 1 is a block diagram illustrating the recording of data on the Karaoke audio cassette.

FIG. 2 is a block diagram illustrating the process in which the data from the karaoke audio cassette is displayed on the display device.

FIG. 3 is a detailed break-down of converter II (Block 11) as illustrated in FIG. 2.

DETAILED DESCRIPTION OF A PREFERRED EMBODIMENT

Figure 4A:
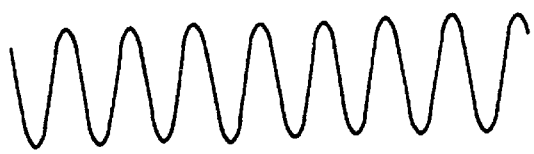
FIG. 4 illustrates the typical waveforms associated with the system as illustrated in the above figures.
Figure 4B:
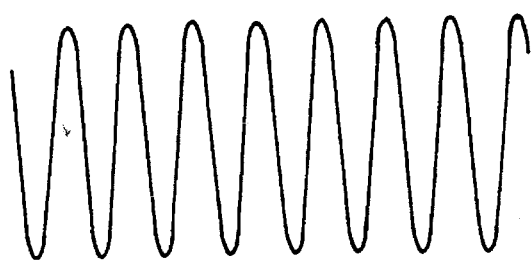
Figure 4C:
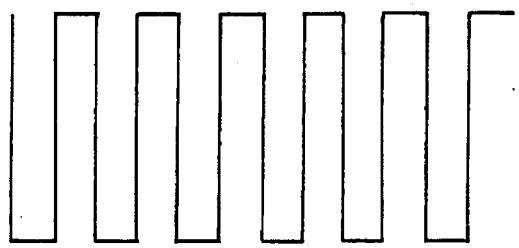
Figure 4D:
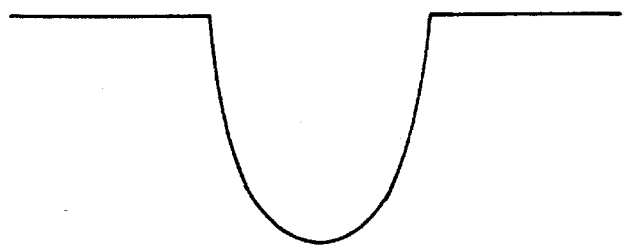
Figure 4E:
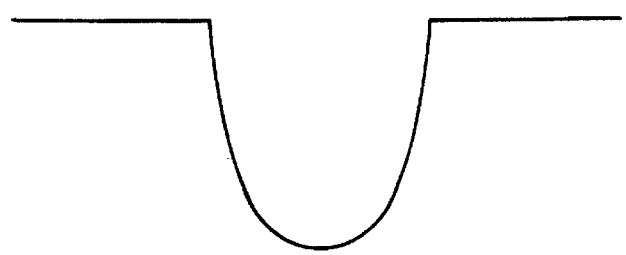
Figure 4F:
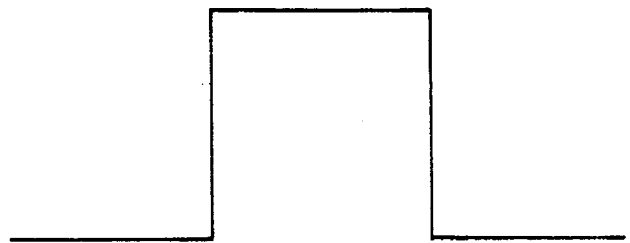

Referring to FIGS. 1 and 4, a host computer (1) serves as the data source with specific format and protocol. The output of the host computer (1) is sent to data converter I (2). The function of data converter I (2) is to convert this digital serial signal into a signal containing two predetermined high frequencies (FIG. 4A), which changes according to the logic level of the received digital signal. This is to facilitate the separation of the data signal from the audio signal for decoding purposes.

The output of data converter I (2) is mixed with audio signal II from the audio master (3) by a mixer (4). The output of the mixer (4) and audio output I of the audio master (3), equalized by attenuator (5) are recorded together during audio recording (6).

Referring to FIG. 2, the cassette is played back in the audio player (7). Output I of the audio player (7) is send directly to the power amplifier (9).

Output II of the audio player (7) is channelled through two different filters, i.e., low pass filter (LPF) (8) and high pass filter (HPF) (10). Output II which passes through the LPF (8)

goes to the power amplifier (9), similar to a normal audio player. LPF (8) will function to block undesired signals, in order to obtain a good audio signal.

Output II which passes through the HPF (10) is a high frequency signal source for the data signal which is not interfered with by the audio signal. Output of the HPF (10) is channelled to the data converter II (11) which converts it into the original data signal. This data signal is decoded and processed by the microprocessor (12). The display controller (12) will further process the signal according to a definite format and protocol, to display the lyrics and information on the display device (13).

Referring to FIGS. 3 and 4, these figures show a description of the processes in data converter II (11) and illustrations of the various relevant waveforms. Amplifier (14) amplifies the signal received from the HPF (10) to obtain the signal shown in FIG. 4B. Shaper (15) shapes the amplified signal into a square wave signal (FIG 4C). Frequency to voltage converter (16) converts the square signal input into a DC level signal output (FIG. 4D). Amplifier and level shifter (17) amplifies the signal (at DC level) received from the frequency to voltage converter (16), and acts as a level shifter to obtain a signal as needed by the Schmitt trigger (18). Schmitt trigger (18) creates a series of pulses at the logic level (FIG. 4F) from the received signal.

Figure 5A:
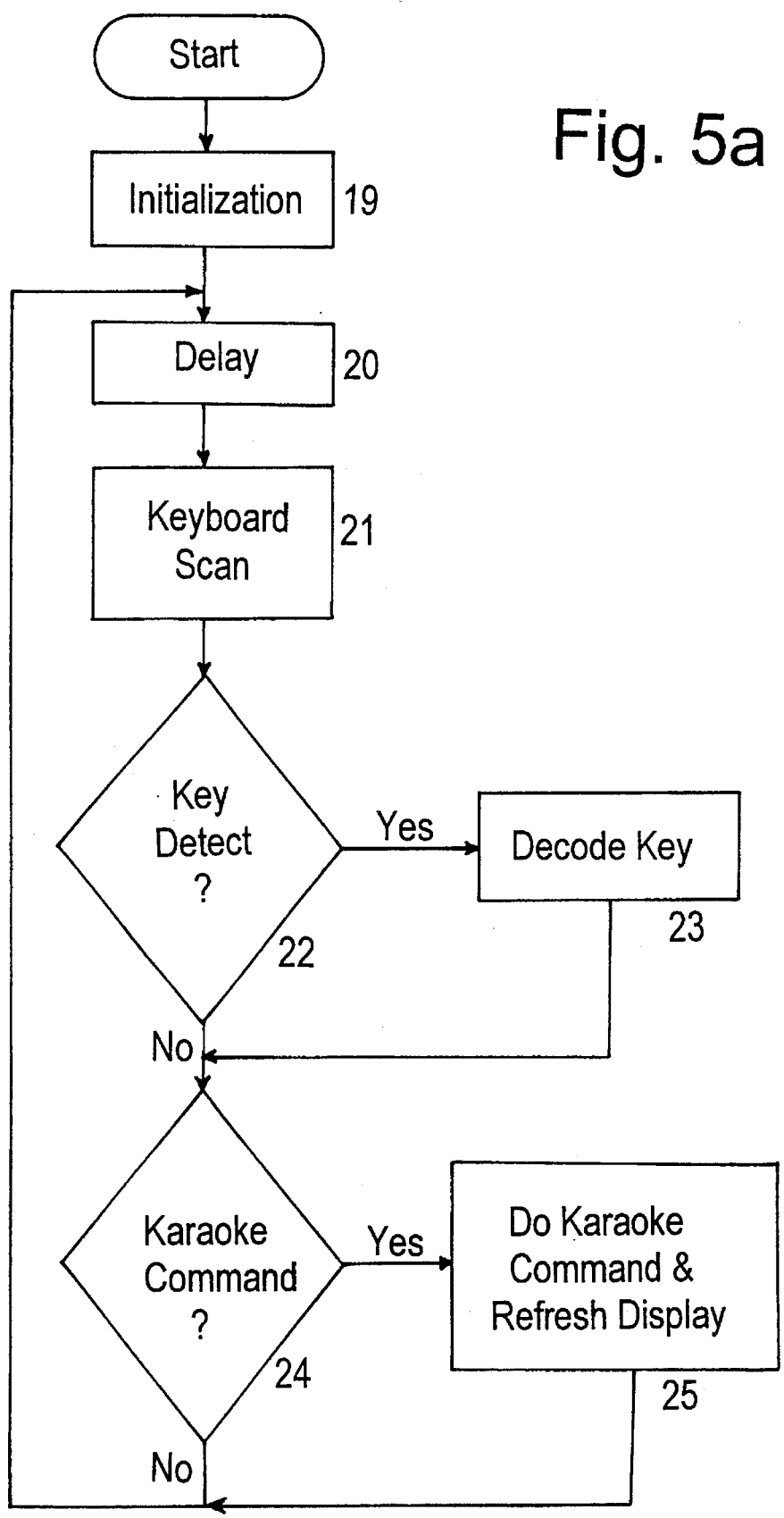
FIG. 5a is a schematic flow chart showing the "Main Loop" of the microprocessor.
Figure 5B:
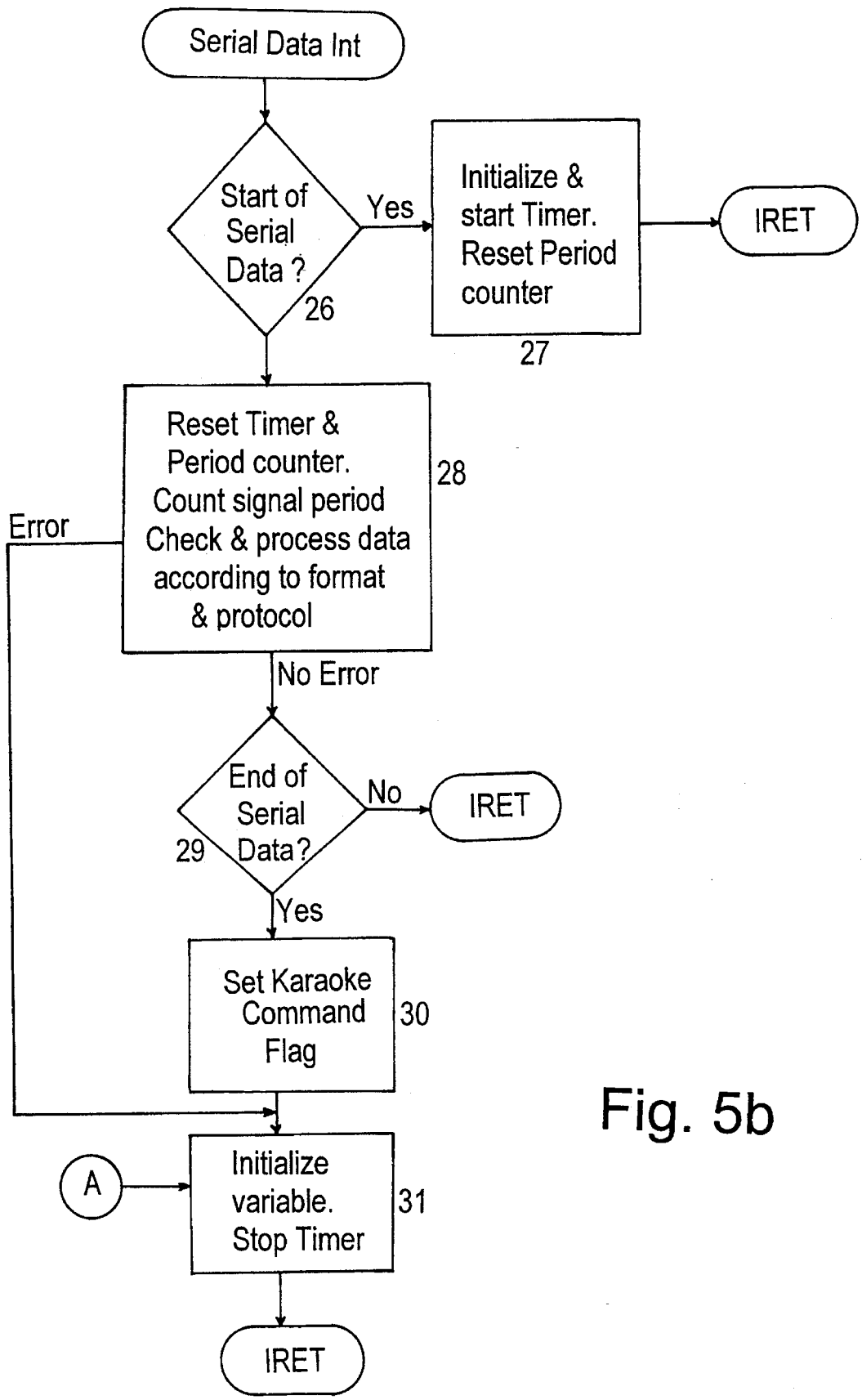
FIG. 5b is a schematic flow chart showing the Serial Data Interrupt.
Figure 5C:
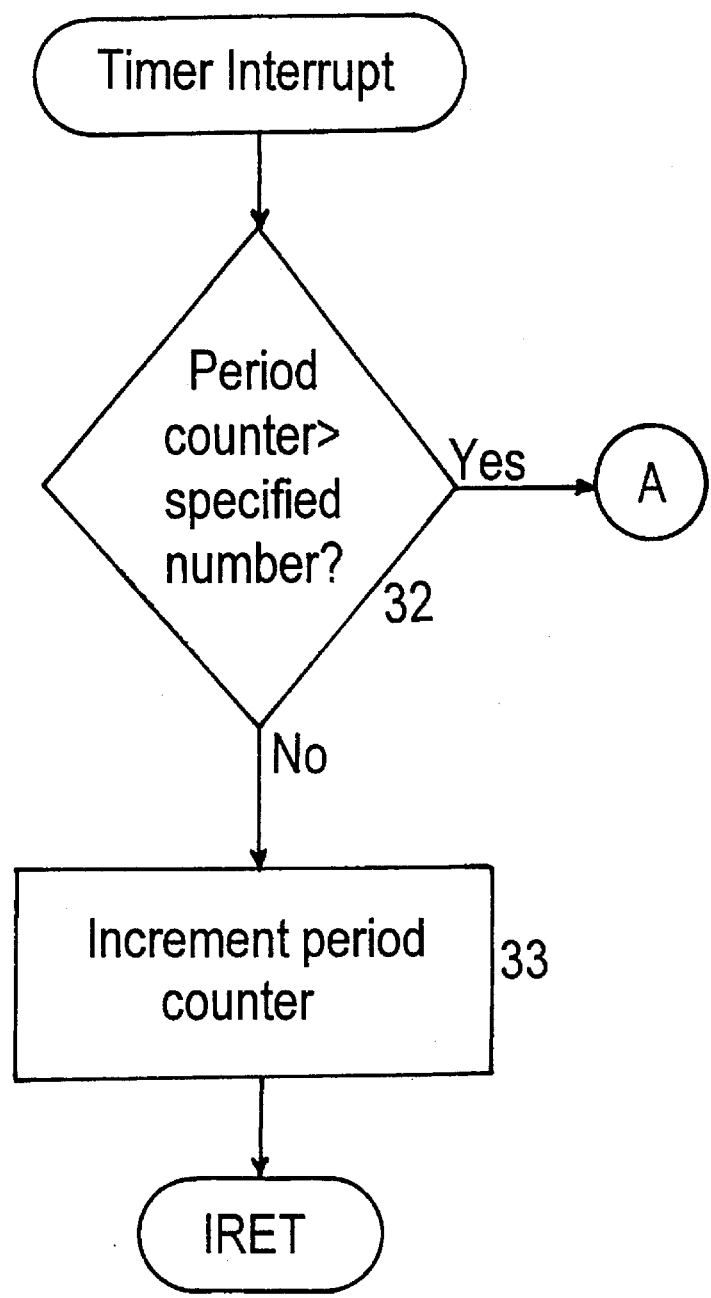
FIG. 5c is a schematic flow chart showing the timer interrupt.

Referring to FIGS. 5a, 5b and 5c. These figures describe, in broad lines, the working of the microprocessor, as follows:

Referring to FIG. 5a (Main Loop), the "Power-On Reset" will start initialization (19) of all parameters of the microprocessor. The next step is the main loop of the microprocessor. The main loop starts with a delay subroutine for a period of several milliseconds (20). Subsequently, the microprocessor will perform a keyboard scan (21), to detect keyboard input. If there is a keyboard input a subroutine will be performed to decode (23) the input and the command is executed according to the input. The next step is for the microprocessor to detect whether there is a karaoke command, by performing the serial data interrupt process (as shown in FIG. 5b). If there is a karaoke command, the microprocessor will execute the command to process for display (25), and return to the Main Loop.

Referring to FIG. 5b (Serial Data Interrupt), in order to process the data, the microprocessor uses a port that produces an interrupt every time there is a change in the logic between high and low, called "negative going edge". This interrupt is handled by the Serial Data Interrupt process. If there is a serial data interrupt, then the microprocessor will detect whether the serial data has started (26).

If the serial data input is confirmed, then the microprocessor will initialize and start the timer, reset the period counter (27), and exit from the subroutine interrupt return or (IRET). If the serial data input is not confirmed, the microprocessor will count the signal period, reset the timer and period counter, check and process data if the format and protocol are confirmed (28).

If no error occurred, then the microprocessor will try to detect the end of the serial data (29). If the end is not detected, the microprocessor will exit from the subroutine (IRET). If then end of the serial data is confirmed, the microprocessor will set the karaoke command (30) to be processed in the Main Loop. The next step is to initialize the variable and stop the timer (31) and exit from the subroutine (IRET).

If an error did occur, the microprocessor will go directly to initialize the variable and stop the timer (31), and then exit from the subroutine (IRET).

Referring to FIG. 5c (Timer Interrupt), the Timer Interrupt subroutine counts the signal periods. In the event of a timer overflow, the Timer Interrupt subroutine will be executed and the microprocessor will detect whether the signal period is larger than the predetermined value. If the signal period is larger, than the microprocessor will go directly to initialize the variable, and stop the timer (31), and exit from the Serial Data Interrupt subroutine. If the signal period is less than the predetermined value (32), then the microprocessor will increase the period counter by 1 (33) and exit from the Timer Interrupt subroutine.

Although embodiments of the invention have been described above, it is not limited thereto and it will be apparent to those skilled in the art that numerous modifications form part of the present invention insofar as they do not depart from the spirit, nature and scope of the claimed and described invention.

We claim:

1. A karaoke system comprising a combination of a karaoke audio cassette player and a video display device, together with a karaoke audio cassette, said karaoke audio cassette having signals recorded thereon comprises of a mixed audio signal and a high frequency encoded data information signal, said player including audio reproduction means for reproducing an audio signal from said karaoke audio cassette, a low pass filter for separating said high frequency encoded data information signal from said mixed audio signal, and amplifying means for amplifying the audio signal and said mixed audio signal from the output of the low pass filter suitable for reproduction of the same through a speaker system; and said player further including a high pass filter adapted to separate a high frequency component of said high frequency encoded data information signal from said mixed audio signal, data converter means for converting the output of said high pass filter into an encoded data information signal, and microprocessor means associated with a display controller for processing said encoded data information signal and for controlling said display device.

2. The system of claim 1, wherein said signals have at least one serial data format, wherein serialized data is encoded in the high frequency encoded data information signal in timed relation with the audio signal.

3. The system of claim 1, wherein said system employs a low frequency audio signal and a high frequency encoded data information signal spaced apart sufficiently to not interfere and selected in the range of from 100 Hz to 250 KHz.

4. A karaoke player system comprising:

a karaoke audio player;

a low pass filter means adapted to the output of said karaoke audio player for separating an audio signal and a high frequency encoded data information signal from a mixed audio signal;

power amplifying means for amplifying said audio signal for transmission to a speaker;

a high pass filter means adapted to output of said karaoke audio player for separating said high frequency encoded data information signal from said mixed audio signal;

a data converter means adapted to convert an output of said high pass filter means into an encoded data information signal; and a microprocessor and display controller means for processing said encoded data information signal and for controlling a display device.

5. The system of claim 1, wherein said cassette player comprises means for playing at least two tracks of said audio cassettes.

* * * * *